United States Patent [19]
Ernst

[11] Patent Number: 5,005,137
[45] Date of Patent: Apr. 2, 1991

[54] METHOD FOR OPTIMIZING DATA STREAMS CONTAINING TWO-BYTE CHARACTERS

[75] Inventor: Theodore R. Ernst, Sugar Land, Tex.

[73] Assignee: BMC Software, Inc., Sugar Land, Tex.

[21] Appl. No.: 294,159

[22] Filed: Jan. 9, 1989

[51] Int. Cl.$^5$ .................. G06F 3/14; G06F 13/00
[52] U.S. Cl. .................. 364/514; 364/200; 364/237.2; 364/232.22; 364/518
[58] Field of Search ............ 364/514, 200 MS File, 364/900 MS File, 518, 148, 150, 237.2, 232.22; 341/173; 382/56

[56] References Cited
U.S. PATENT DOCUMENTS

| | | | |
|---|---|---|---|
| 4,545,011 | 10/1985 | Lyon et al. | 364/200 |
| 4,750,137 | 6/1988 | Harper et al. | 364/514 |
| 4,819,149 | 4/1989 | Sanik et al. | 364/200 |
| 4,837,679 | 6/1989 | Wiles, Jr. et al. | 364/514 |
| 4,853,875 | 8/1989 | Brown | 364/514 |
| 4,937,739 | 6/1990 | Ernst et al. | 364/200 |

Primary Examiner—Parshotam S. Lall
Assistant Examiner—Ellis B. Ramirez
Attorney, Agent, or Firm—Arnold, White & Durkee

[57] ABSTRACT

An optimizer system optomizes and validates data streams in whcih double-byte character set data may be transmitted. The optimizer, maintaining an image or map of data contained in a peripheral device buffer, sets and monitors the status of three flags located in extended attribute planes for the purpose of processing data stream orders when a double-byte character set is in use.

12 Claims, 14 Drawing Sheets

FIGURE 4
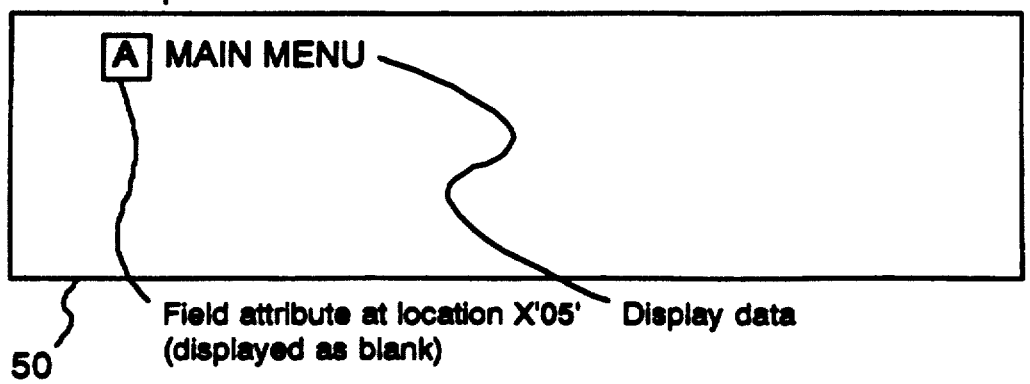
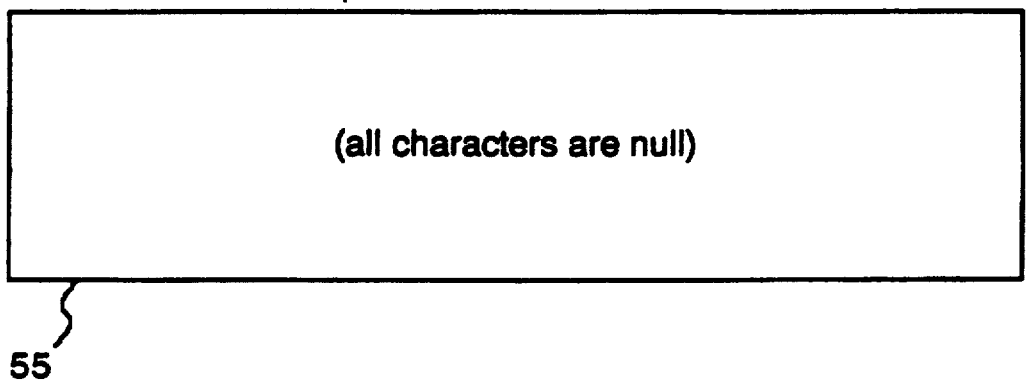
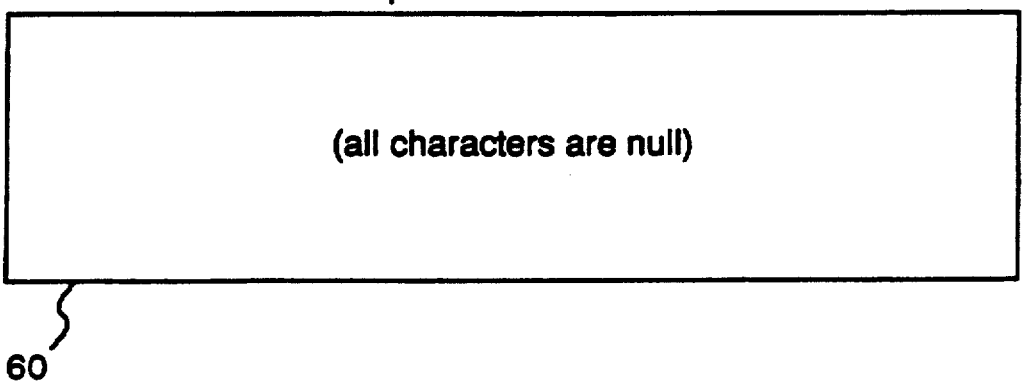

FIGURE 7

Character plane

```
42 C5 42 D5 42 C4
```
— Location X'04'

50

First extended attribute plane

```
20 20 20 20 20 20
```
— Location X'04'

55

Second extended attribute plane

```
10 10 10 10 10 10
```
— Location X'04'

60

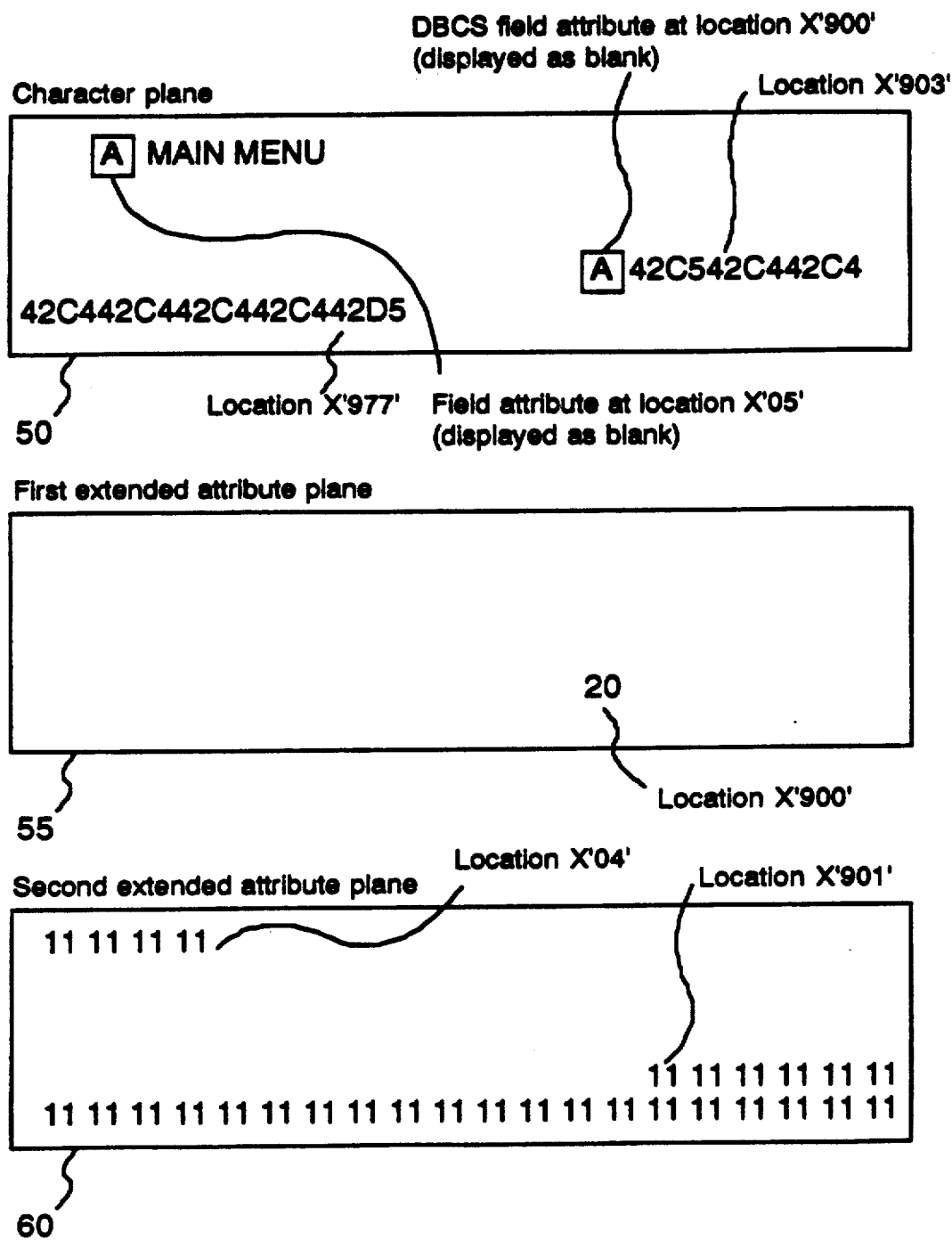

METHOD FOR OPTIMIZING DATA STREAMS CONTAINING TWO-BYTE CHARACTERS

BACKGROUND OF THE INVENTION

Cross-Reference to Related Applications

This application relates to improvements in a system for optimizing data transmissions between a host computer and a peripheral device such as that disclosed in U.S. Pat. No. 4,750,137 (hereafter "the '137 patent"), issued June 7, 1988 to Harper et al., and assigned to the assignee of this application, which is incorporated herein by reference. It also relates to the following copending applications: Ser. No. 948,150, now U.S. Pat. No. 4,837,679, "System for Supporting an Erase Input Key with Input Suppression", filed Dec. 31, 1986, and Ser. Nos. 224,895, now U.S. Pat. No. 4,937,739 "Improved Data Transmission Optimizer including Programmable Symbol Code Point Sorting", 224,922, "Improved Data Transmission Optimizer including Device-Specific Attribute Elimination", 225,033, "Improved Data Transmission Optimizer including Dark Field Elimination", and 225,034, "Improved Data Transmission Optimizer including Query Suppression", all filed July 27, 1988, and all of which are assigned to the assignee of this application.

Specifically, this application relates to optimization and validation of data streams in computer systems using characters that cannot be uniquely referenced in a single byte.

Basics of the Optimizing System

The system disclosed in the '137 patent is one for optimizing the telecommunication of formatted data streams between a host computer, on the one hand, and a device that notes the data stream content in an addressable buffer, on the other. The device may be, for example, a screen-type display terminal, a printer, or other apparatus. The host and device may be in close physical proximity, as in the case of a local terminal at the site of the host, or they may be physically remote, as in the case of a dial-up terminal used to communicate with the host.

Referring to FIGS. 1 and 2, the '137 patent discloses mapping-type optimizing systems for optimizing data exchanges between a host unit 25 (e.g., a database application program running on a programmable computer) and a peripheral device 15 that has an addressable buffer (e.g., a terminal device). The addressable buffer may be a screen buffer 16 and/or one or more programmable symbol buffers 17.

Generally speaking, if the host unit 25 attempts to send any signal to the peripheral device 15 (e.g., a signal that would cause an erasure and a subsequent rewriting of the device's buffer), the optimizing system:

(1) intercepts or blocks the attempt;
(2) compares (i) a present-state map of the existing information contents of the buffer with (ii) an intended-state map of those information contents as expected to exist after receipt of the signal by the peripheral device 15;
(3) constructs a new signal that, instead of erasing and rewriting the buffer, "surgically" changes those portions of the buffer that need changing; and
(4) sends the new signal to the peripheral device 15 in place of the original signal from the host unit 25.

As shown in FIG. 2, the map comparison step generally consists of performing an exclusive-OR (XOR) process, using the present-state map and the intended-state map as operands to generate a difference map. In the difference map, null characters signify locations where the present-state map and the intended-state map are identical; non-null characters signify locations where they differ. From this information, the new signal is constructed.

Double-Byte Character Sets

Most computer systems exchange information by sending data in increments of one byte, or eight bits. This has been accepted as a standard because English-language communication requires only one byte to uniquely reference any one of the letters of the alphabet and Arabic numerals. (In fact, since there are 256 possible combinations in eight bits, a byte-wide code allows for many other codes and symbols in addition to letters and numbers.) The well-known ASCII (American Standard Code for Information Interchange) standard is a widely used example of a byte-wide code.

Asian languages, however, typically use different character sets such as Kanji. These character sets often have many more unique characters than Western alphabets. It is therefore necessary to use a code having more combinations than possible in eight bits. Since data transmission standards already recognize the byte as the basic unit of data, one of these characters must then be sent as a group of two bytes.

Double-byte character sets (DBCS) are not new; however, they present additional problems for systems performing optimization. Because the execution of some orders, such as Repeat-to-Address (RA), depend on whether or not the current buffer address is in a DBCS field, some orders must be processed differently in a DBCS field.

A specific example of this is a light pen-detectable DBCS field. A light pen-detectable field normally consists of a specific light-pen attribute followed by a designator character. However, in a DBCS field, the designator characters are two-byte characters, different from the characters used as designators in single-byte fields.

Several other data stream orders, such as some control characters or printer orders, include null values when appearing in a DBCS field. The optimizer described in the '137 patent, however, can operate to suppress nulls. Consequently, optimization support for DBCS fields must take the existence of these null values into account. For example, DBCS support must account for the null values that appear in the following 3270 printer orders: New Line (X'0015'), End of Message (X'0019'), Form Feed (X'000C'), and Carriage Return (X'000D'). Likewise, two control characters also include null values when appearing in a DBCS field: Duplicate (X'001C') and Field Mark (X'001E').

Data Stream Orders

Data stream orders are control information sent as part of the data stream itself. On the IBM ™ 3270 system, DBCS characters can originate by way of four data stream orders: Set Attribute (SA), Start Field Extended (SFE), Modify Field (MF), or the pair Shift Out (SO) and Shift In (SI).

A Set Attribute (SA) order initiating DBCS specifies that all bytes following this order shall be DBCS data, until another SA order is encountered.

A Start Field Extended (SFE) order initiating DBCS creates an attribute at the current buffer location and specifies that the characters up to the next field attribute will be DBCS characters.

Modify Field (MF) modifies an existing attribute. An MF order initiating DBCS specifies that the characters up to the next field attribute will be DBCS characters. Aside from the fact that an MF order modifies an existing attribute to begin a field, instead of providing an entirely new attribute, its operation is the same as the SFE order.

The Shift Out/Shift In pair operates only on a non-DBCS field. When an order signifying Shift Out is received, all subsequent bytes are taken to be DBCS characters until a Shift In order occurs to cause a return to the single-byte character set.

Buffer Planes and Attributes

It is possible to transmit additional information to peripheral devices such as color or highlighting through the use of separate buffer planes. The IBM 3270 system, for example, stores each byte which is a displayable character in a portion of the addressable buffer called the "character plane". One or more "extended attribute" buffer planes may be used to store additional information about the fields or the individual bytes in the character plane. FIG. 3 illustrates the one-to-one correspondence of buffer locations in separate planes of a display buffer 16.

Attributes determine the display format of entire fields or characters in a field. The IBM 3270 system has three kinds of attributes: field attributes, extended field attributes, and character attributes.

Field attributes define the start and end of fields within a formatted display system. A field attribute occupies one character position in the character plane, but are displayed as blank space.

Extended field attributes reside in one or more extended attribute planes; each extended field attribute occupies a position corresponding to a field attribute's position in the character plane.

Character attributes also reside in an extended attribute plane; however, character attributes modify the format only of their corresponding character in the character plane. They do not affect entire fields.

The "Look Left" Rule

Some data stream orders reference buffer locations directly, and it is therefore necessary to determine that the orders are valid. An invalid order would be one that attempted to use DBCS data, for example, but addressed the data beginning on the second byte of each DBCS character, rather than the first byte.

Determining which character set applies to a particular byte has been performed in the past using a "look left" rule. Briefly, when the application program wishes to determine the character set for a buffer location, the program searches, toward the beginning of the buffer ("left"), for a DBCS extended field attribute, an SO or SI order, or the character attribute which exists in the first extended plane. If none of these are found, the single-byte character default is assumed.

The "look left" process presents a number of problems. An optimizer performing optimization of data streams would need to make such a determination every time an order is issued that is dependent upon the character set, such as the Repeat-to-Address order. This would be necessary even if no DBCS data was in this particular data stream, due to the fact that earlier data streams could have established DBCS fields. Additionally, the exclusive-OR process used to map the existing screen buffer to the new screen image indicates only those characters that have changed and need to be transmitted. It is possible that a byte of DBCS data may be masked out during the exclusive-OR process, but occur on the new screen image as the second byte of a DBCS character when it was previously the first byte. The optimizer must be able to quickly determine which byte of a DBCS character is the first byte, and which is the second. The "look left" rule is thought to be excessively time-consuming and complex to implement in a data stream optimizer.

SUMMARY OF THE INVENTION

In accordance with the invention, an optimizer system such as one disclosed in U.S. Pat. No. 4,750,137 additionally provides for processing of data stream orders in which all or part of the data uses a double-byte character set. An improved optimizer system according to the invention may optimize DBCS data in the normal manner by maintaining three flags in extended attribute planes to determine at once the character set in use.

In a first extended attribute plane, one normally unused bit is set: (1) to indicate that a Set Attribute (SA) order indicating DBCS was issued prior to generating this character, or (2) to indicate that a field attribute resides in this location in the character plane, if an SFE (Set Field Extended) specifying DBCS was issued for this attribute. This bit may be treated in the same manner as other extended attribute bits denoting color, highlighting, or the like.

A second extended attribute plane has two flags associated with DBCS. One bit of the second extended attribute plane indicates that the character at this location in the character plane is a DBCS character. This bit is used only for the immediate detection of DBCS presence or absence, and is not dependent upon how the DBCS character obtained DBCS status. In other words, it is not dependent on the data stream order (SFE, SO/SI, and so on) used to generate DBCS data.

When a data stream is received by the optimizer, the optimizer scans the data stream to update the intended-state image with the information found. When the optimizer generates a substitute data stream, the optimizer uses the image that had been updated to generate the new data stream. Since many orders behave differently with DBCS, the optimizer needs to know which character set is in use to generate valid data stream orders. By checking the first of these two flags to see if the current character is a DBCS character, this determination is made immediately.

The second extended plane also has a second bit representing whether the character located at this same position in the character plane is the first or the second byte of a DBCS character. This flag is set as follows: if the first byte of this DBCS character is located at an odd buffer location, this flag is set in both bytes of the DBCS character. If the first byte is location at an even buffer location, this flag is cleared in both bytes of the DBCS character.

This bit is needed because some orders specify buffer locations as part of the instruction. Examples of this on the IBM 3270 system are Repeat-to-Address (RA), Set Buffer Address (SBA), and Erase Unprotected Address (EUA). These orders must not specify the second byte of a DBCS character (in the case of an SBA order, if graphic data immediately follows the SBA), or an error will result.

If the optimizer determines that the order to be validated is a Repeat-to-Address (RA) order occurring within a DBCS field, the RA order is assumed to be followed immediately by the ending buffer address (i.e., the address to which characters are repeated) and two characters to be repeated (rather than one, as in a single-byte character set).

If the optimizer processes a light pen detectable attribute within a DBCS field, a check is made for certain DBCS light pen designator characters. In an incoming data stream, nulls are normally invalid. However, if a null immediately precedes such items as certain printer orders, while part of a DBCS field, it is considered valid.

When validating a data stream order that specifies a buffer location as discussed above, the optimizer checks the current buffer location to see if it is occupied by a DBCS character. If the current buffer location is DBCS, then the optimizer checks to see if the first byte of that DBCS character is at an odd or even buffer location. The optimizer then determines if the order is valid by comparing the current buffer location to the buffer location of the first byte of the DBCS character. The order is valid only if the location of the first byte of the DBCS character and the current buffer location are both even, or if the location of the first byte of the DBCS character and the current buffer location are both odd. If one of these conditions is not met, then the order is invalid and will be rejected.

When the optimizer generates a data stream from the updated image, it ensures that the generated orders are syntactically correct if they reference DBCS data. The optimizer also ensures that any character data placed into the generated data stream is correct. Frequently, it is determined by the image masking process that only one character has changed and therefore may be the only one to be sent. If this is part of a DBCS character, however, sending an odd number of bytes may not be correct, and an additional consecutive byte may be sent in order to make the data stream valid.

BRIEF DESCRIPTION OF DRAWINGS

FIG. 4 is a map representing a buffer having a character plane and two extended attribute planes;

FIG. 7 is a map depicting the effect of processing a Set Attribute (SA) instruction on the contents of a buffer;

FIG. 9 is a map depicting the effect of processing a Repeat-to-Address (RA) order on the buffer of FIG. 5;

DETAILED DESCRIPTION OF SPECIFIC EMBODIMENTS

Figure 1:
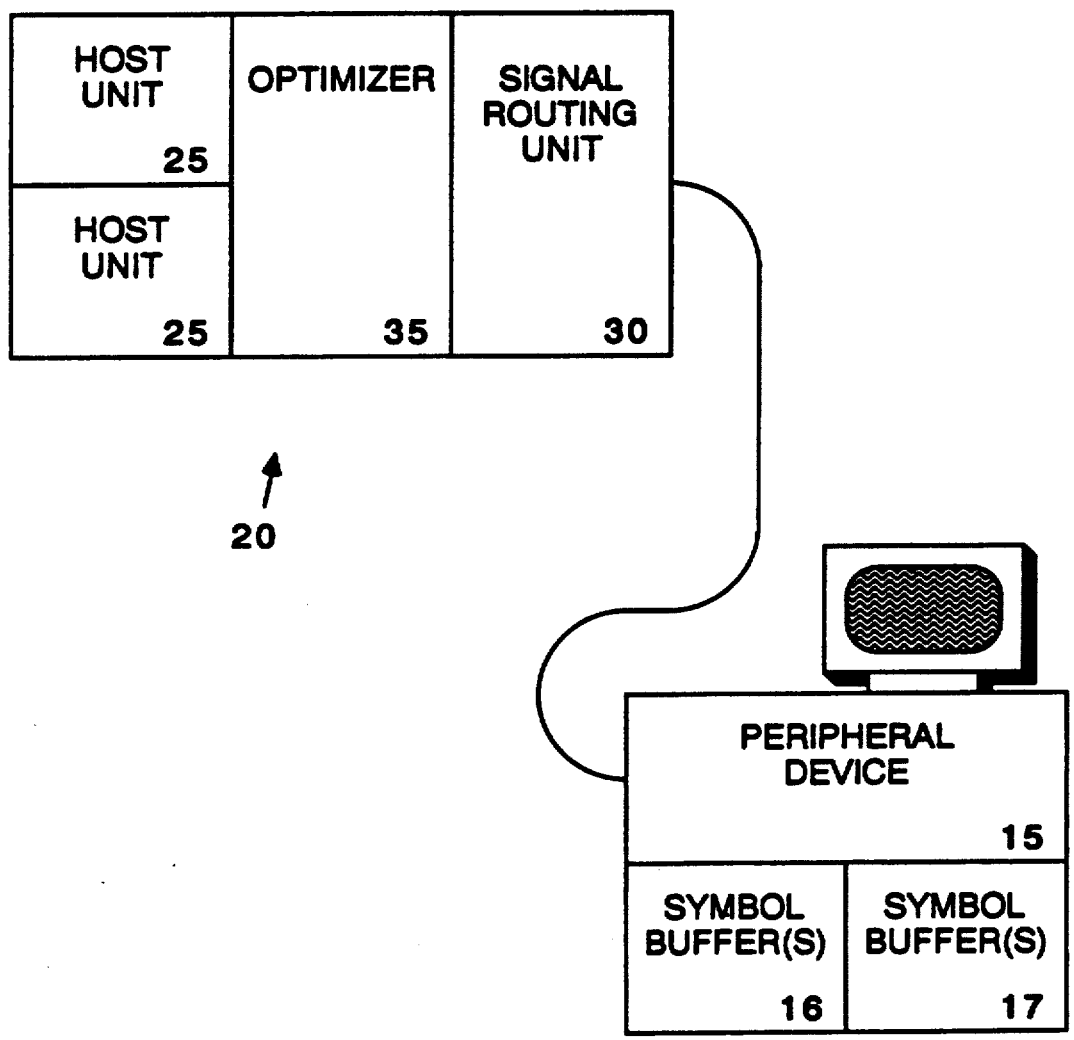
FIG. 1 is a simplified block diagram of a typical host unit application program as used in a telecommunications system, having an optimizer interposed between the application program and a signal routing unit.
Figure 2:
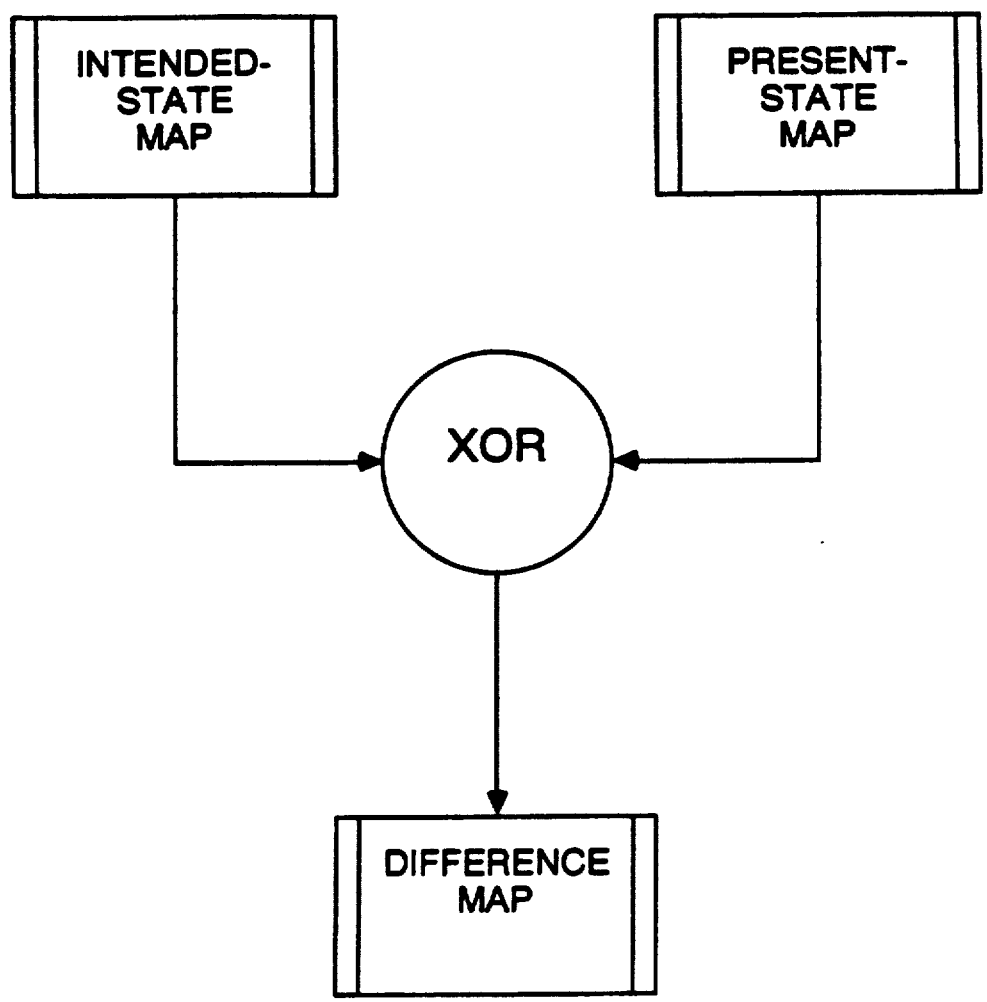
FIG. 2 is a block diagram of the exclusive-OR (XOR) process used in the '137 patent to generate a difference map signifying changes in a buffer of a peripheral device.
Figure 3:
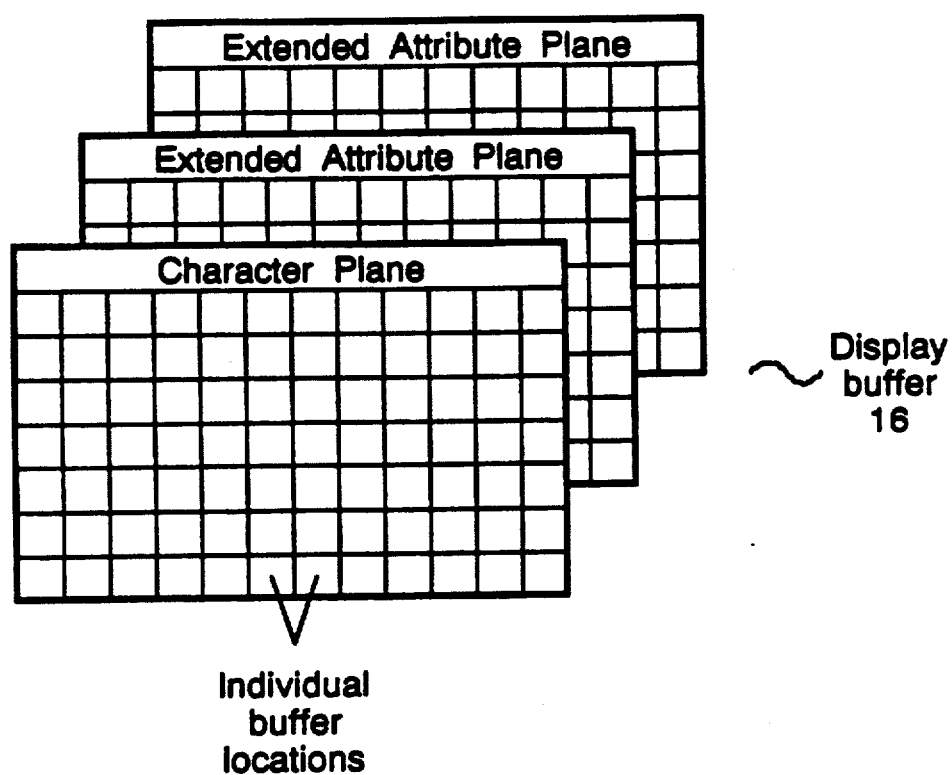
FIG. 3 depicts a display buffer having extended attribute planes.

Referring to FIG. 1, a telecommunications system is shown in which incoming and outgoing signals are exchanged between a peripheral device 15 and a host computer 20. (An incoming signal is defined here as a signal transmitted from the peripheral device 15 to the host computer 20. An outgoing signal is one that is transmitted from the host computer 20 to the peripheral device 15.)

The host computer 20 typically executes multiple computer programs substantially concurrently (e.g., in a multi-programming environment such as provided by the IBM MVS system). As shown in FIG. 1, the host computer 20 executes host unit application programs 25 and a signal routing unit program 30 which handles communications between the host computer 20 and the peripheral device 15.

The peripheral device receives and interprets data streams from the host computer 20, updating its buffer according to the interpretation. The peripheral device 15 also transmits any data input by the peripheral device user to the host computer 20.

An optimizer 35 monitors communications between the host units 25 and the peripheral device 15 by intercepting incoming and outgoing signals. As shown in FIG. 1, the optimizer 35 is interposed between the host units 25 and the signal routing unit 30. (References to the optimizer 35 performing a function will be understood to include a general purpose computer executing an optimizer program.)

The general approach of the optimizer 35 for outgoing and incoming signals is described in detail in the '137 patent and in the copending applications referenced above; the description which follows pertains only to DBCS support.

Setting of DBCS Flags in Response to Data Stream Orders

FIG. 4 represents the contents of a image or map maintained by the optimizer 35 and having a character plane 50 and two extended attribute planes 55 and 60. The planes 50, 55, and 60 correspond to similar planes of the buffer of the peripheral device 15.

Assume that, as shown in the Figure, the character plane 50 contains a protected field attribute (denoted by "A" for "attribute") at buffer location X'05'. (Since a field attribute occupies a place in the character plane, but is displayed only as a blank, field attributes are depicted throughout the drawings as an "A" enclosed in a square.) Nine bytes of display characters follow. The remainder of the character plane is assumed to be null (X'00'). The first and second extended attribute planes 55 and 60 comprise null characters; no extended attributes are assumed to exist.

(For purposes of explanation, a number written X'01' is assumed to mean hexadecimal value 1, X'0E' refers to hexadecimal value E, and so on. Hexadecimal notation is commonly used to quickly represent the respective bits of a particular byte; for instance, the byte 01100001 may be expressed as X'61'.)

Example 1: Effect of processing an SFE order

Figure 5:
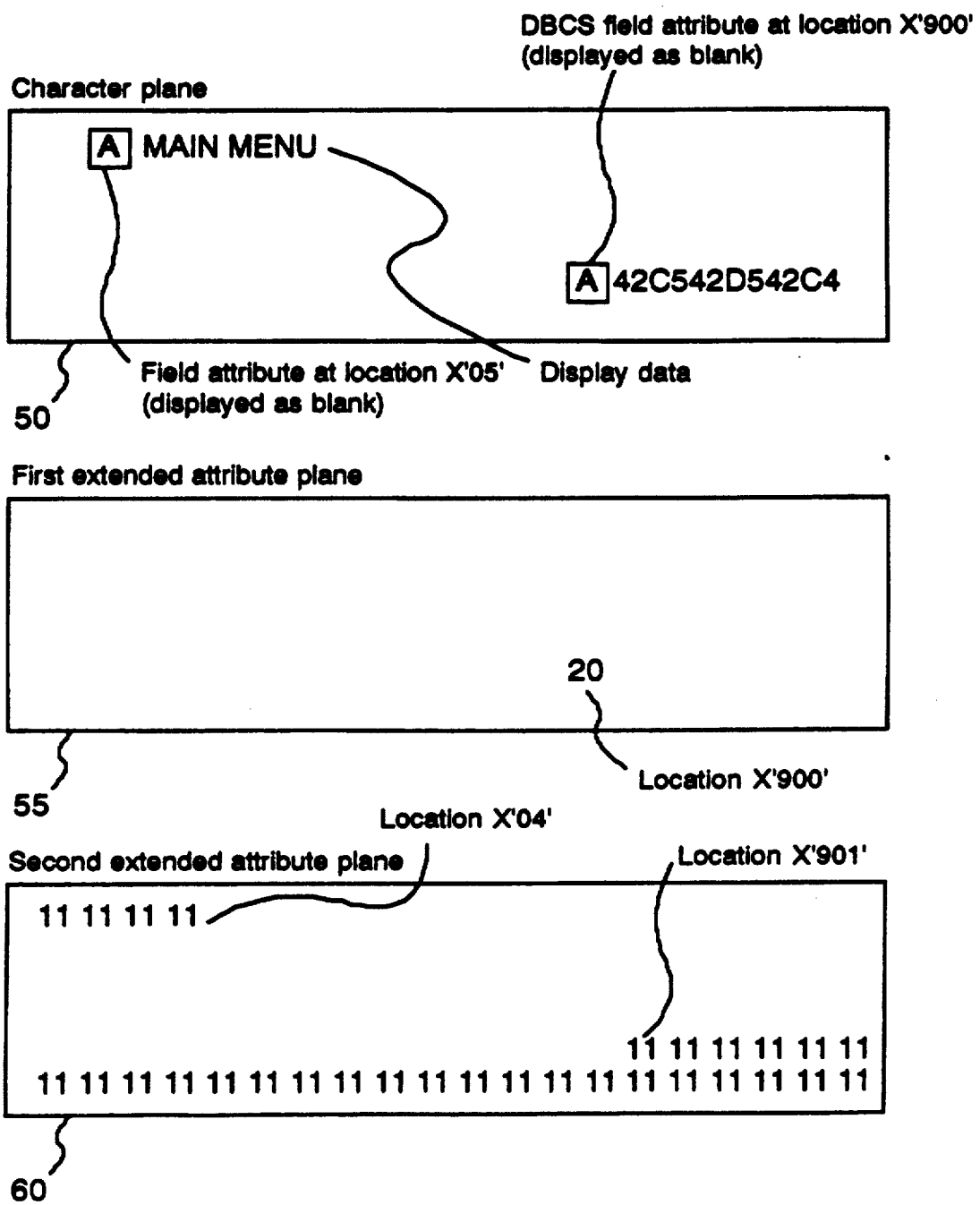
FIG. 5 is a similar map representing the contents of the same buffer after the processing of a sample data stream containing an SFE order.

Referring to FIG. 5, now assume that the map's contents are altered by the optimizer 35, in response to a sample incoming data stream. FIG. 5 illustrates the action of the optimizer 35 after the issuance of a specific Start Field Extended (SFE) order to begin DBCS data, using the same maplike representation. (As mentioned before, SFE and other orders do not intrinsically begin a DBCS field; a particular order may be used to specify such things as color, highlighting, and the like; here we assume that the SFE given indicates the start of a DBCS field.)

After the optimizer 35 processes this sample data stream, the character plane 50 shows a field attribute byte indicating DBCS (denoted by "A" for "attribute") located at location X'900', followed by three DBCS characters, or six bytes. The optimizer 35 alters the first extended attribute plane 55 so that it contains the value X'20' at location X'900'. This X'20' value is an extended field attribute indicating that a DBCS field immediately follows.

The optimizer 35 alters the second extended attribute plane 60 so that it has flags set at locations X'901' to the end of the plane, and from the beginning of the plane to location X'04'. In this manner, the DBCS field "wraps around" from the end of the plane to the beginning, continuing until another field attribute is found. (This is due to a "wraparound" function used on the IBM 3270 system. If a field continues to the end of a buffer without being terminated by another field attribute, then the data at the beginning of the buffer keeps the characteristics of that field until the next field attribute is reached.)

As seen in FIG. 5, the first of the flags of the second extended attribute plane 60 is set on for each location of the field because the first DBCS character of the field (and thus all subsequent DBCS characters of the field) begins at X'901', an odd-numbered location. The other flag simply indicates that the current byte is part of a DBCS character.

Under the 3270 protocol, an SFE order affects every location up to the next attribute, whether data currently exists in those locations or not. Therefore the optimizer 35 sets the flags in the second extended attribute plane 60, even though the incoming data stream did not contain DBCS characters all the way to the end of that field.

Since the SFE order begins an entirely new field, this order may require that a large number of DBCS flags be set at one time. This number is not known until the next order is received by the optimizer 35; therefore, the optimizer waits to set the flags in the extended attribute planes 55 and 60 until it receives the next data stream order. Before processing the next order, the optimizer 35 then sets the DBCS flags as necessary. The optimizer's waiting for the next order is done in order to process more quickly and efficiently.

Figure 5A:
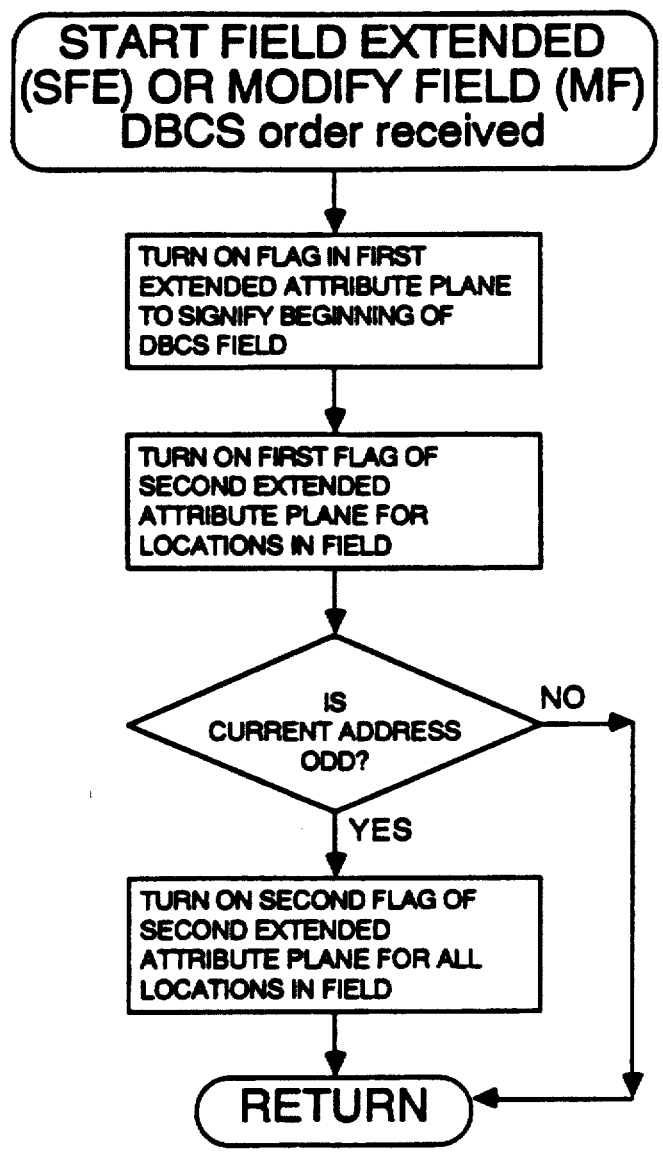
FIG. 5A is a flowchart depicting the operations performed by the optimizer upon receipt of a Start Field Extended or Modify Field order.

FIG. 5A depicts more generally the actions taken by the optimizer 35 upon receiving a Start Field Extended or Modify Field order. As mentioned earlier, the MF order is identical in operation to the SFE order, except that the MF order modifies the previous field attribute. The optimizer 35 processes MF orders in the same manner as SFE orders.

If an SFE or MF order not signifying DBCS is received, overwriting a previously existing DBCS field, the optimizer turns off all DBCS flags in the locations of the new single-byte character field.

Example 2: Effect of processing an SF order

Figure 6:
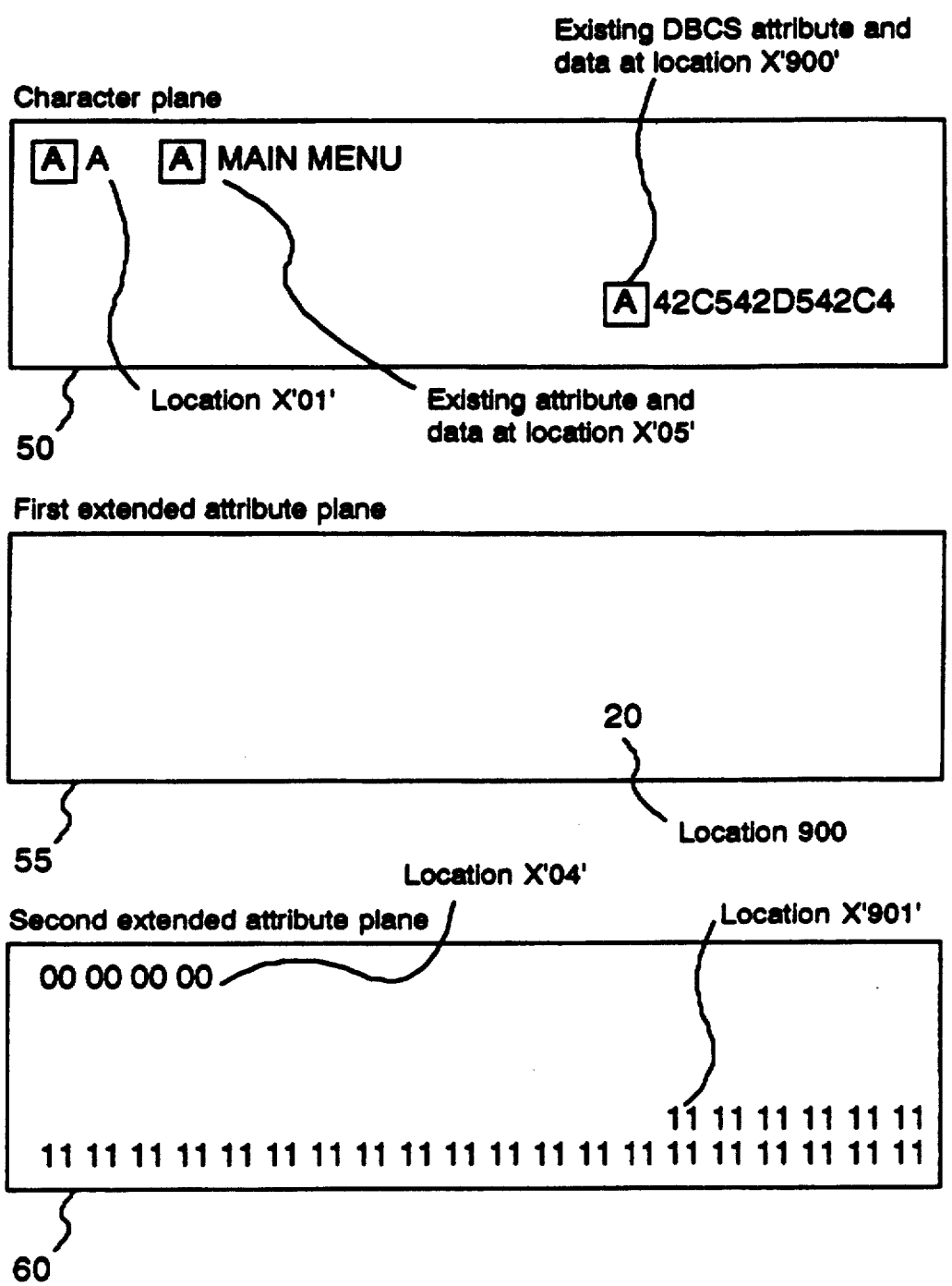
FIG. 6 depicts a map of the contents of the buffer of FIG. 5 after processing a sample data stream containing a Start Field (SF) order.

FIG. 6 depicts the effect of processing by the optimizer 35 on a specific Start Field (SF) order to turn off DBCS, on the contents of the map of FIG. 5. Assume that at location X'01' in the character plane 50, a normal field attribute is placed, followed by one display character. The character plane 50 is otherwise unchanged. Then, as seen in FIG. 6, the first extended attribute plane 55 remains unchanged; in the second extended attribute plane 60, all DBCS flags occurring after the location of the new attribute are turned off.

Example 3: Effect of processing an SA order

FIG. 7 illustrates the optimizer's processing of a specific Set Attribute (SA) instruction to indicate DBCS. The character plane and both extended attribute planes are assumed to be entirely null characters before reception of this sample data stream.

Figure 7A:
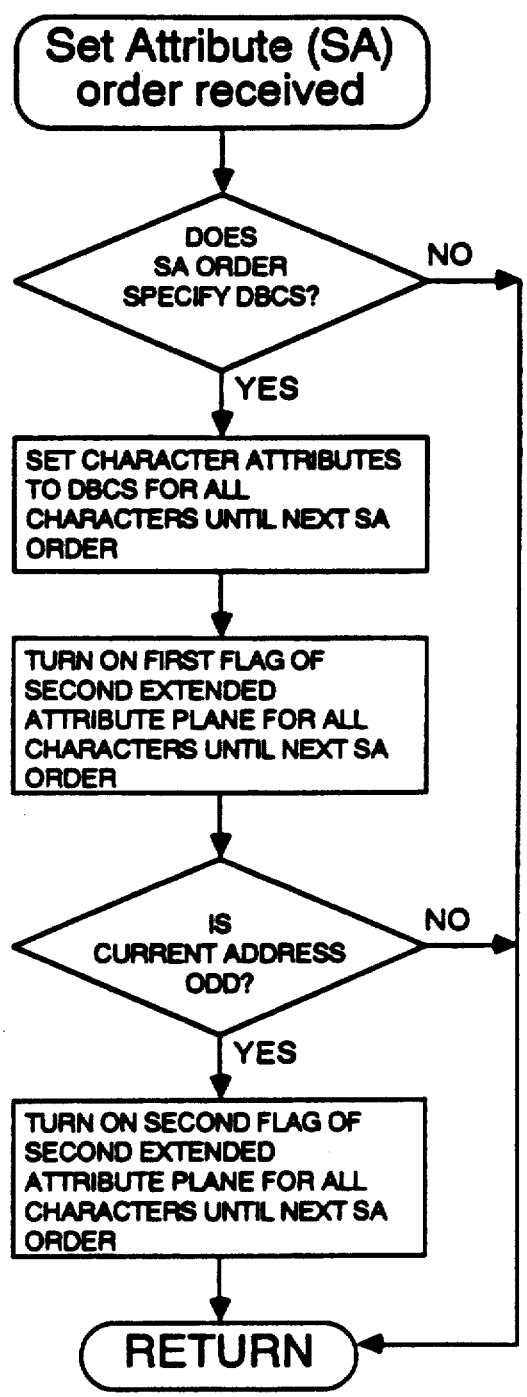
FIG. 7A is a flowchart depicting the operations performed by the optimizer upon receipt of a Set Attribute order.

The example shown in FIG. 7 has, in the character plane 50, an SA instruction at X'04' followed by five bytes of display data. In the first extended attribute plane 55, character attributes are set by the optimizer for all six bytes (one for the instruction and five for the display data). In the second extended attribute plane 60, the optimizer 35 sets one flag at each of the six locations to indicate DBCS data; the optimizer 35 clears the other flag at each of the six locations, because the DBCS characters begin at an even-numbered location. FIG. 7A illustrates more generally the actions taken by the optimizer 35 in response to a Set Attribute order.

Example 4: Effect of processing an SO/SI pair

Figure 8:
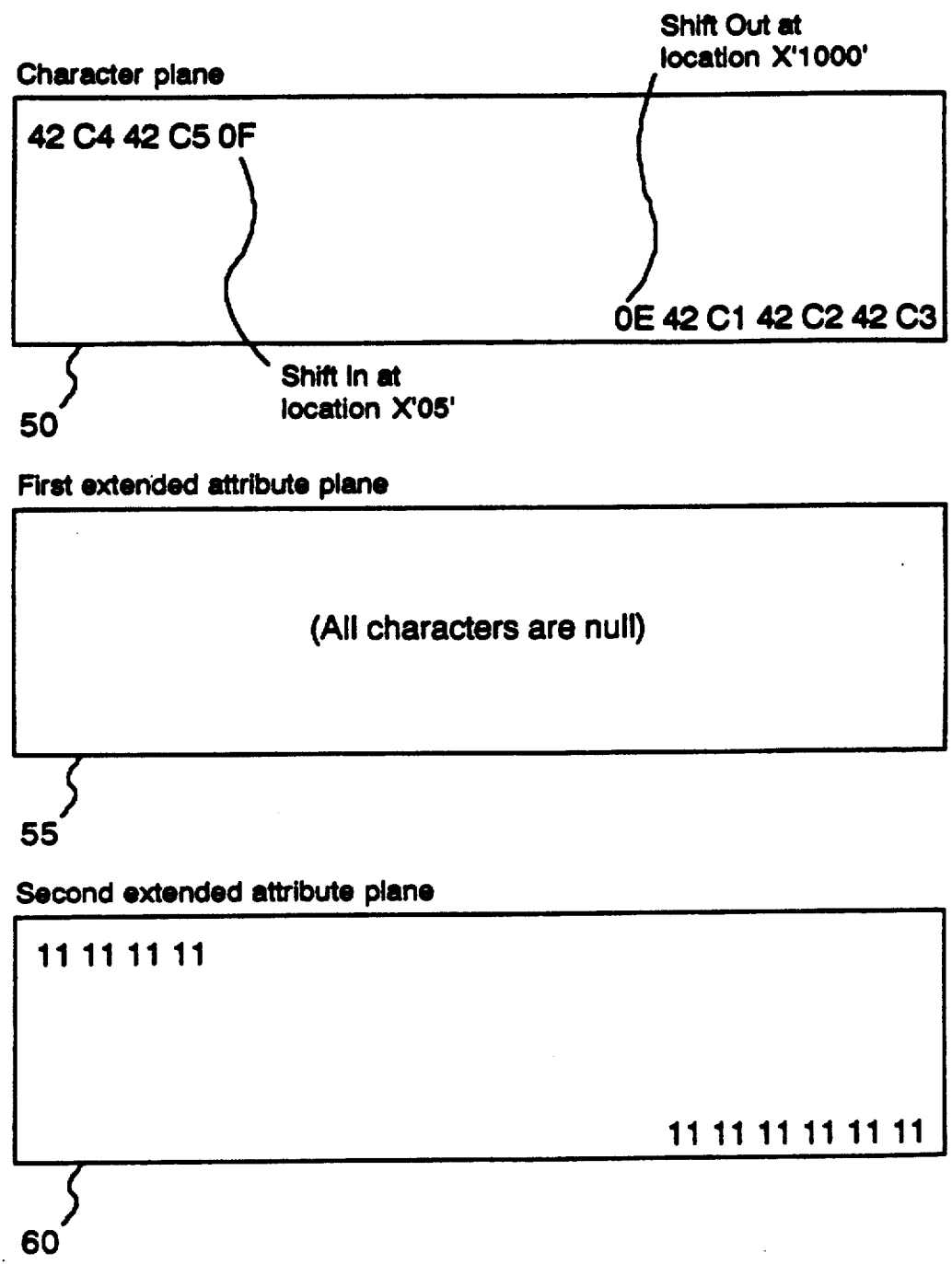
FIG. 8 is a map depicting the effect of processing a Shift Out/Shift In (SO/SI) pair.

FIG. 8 illustrates the way in which the optimizer 35 handles the Shift Out/Shift In function of the IBM 3270. The Shift Out/Shift In pair differs from other 3270 data stream orders in that they are only used in conjunction with DBCS data; by definition, they indicate that the data in between the pair is DBCS data. In the sample data stream, assume that the value X'0E' is placed at location X'1000', signifying Shift Out (SO). Following SO are five DBCS characters (ten bytes of data). The eleventh byte is a Shift In (SI) order signifying the end of DBCS data. Note that this example also illustrates that the effect of data stream orders signifying DBCS "wraps around" to the beginning of a buffer when the end is reached.

Figure 8A:
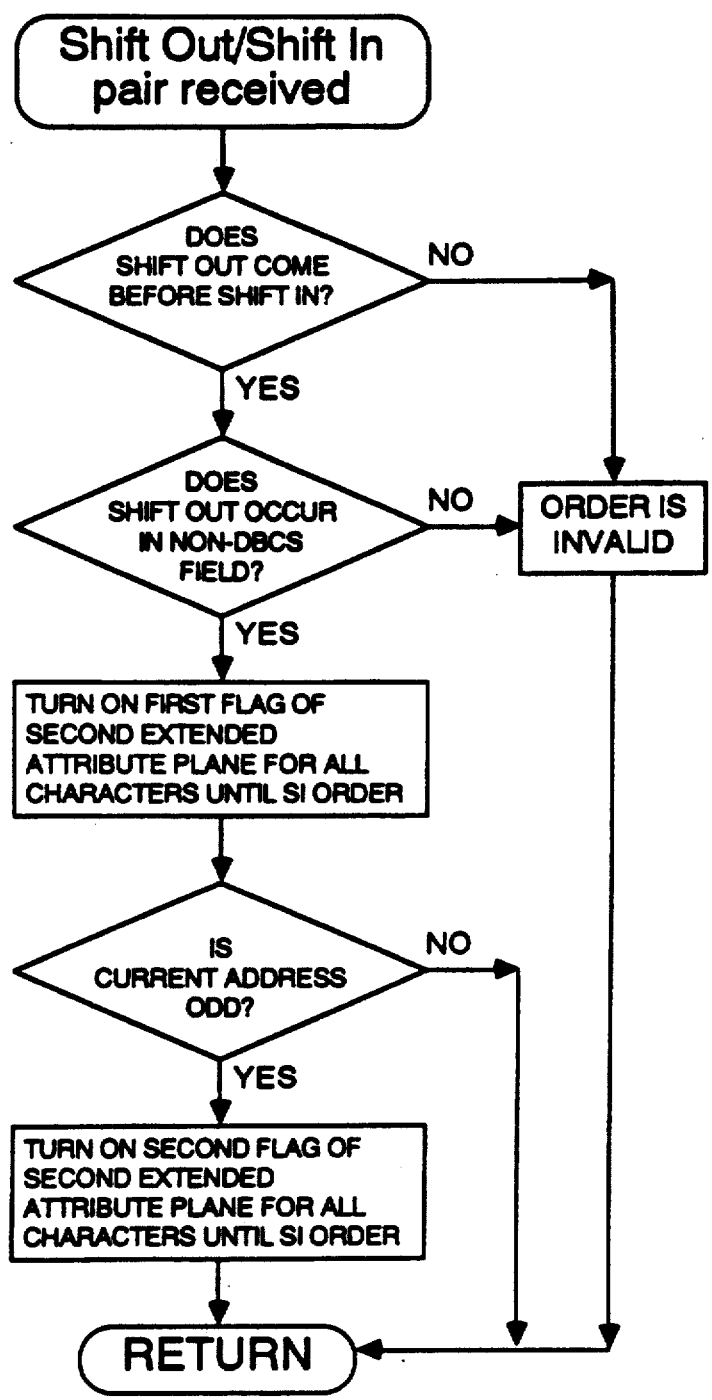
FIG. 8A is a flowchart depicting the operations performed by the optimizer upon receiving a Shift Out/Shift In pair.

The optimizer 35 leaves the first extended plane 55 entirely null; SO and SI have no effect on this plane. In the second extended plane 60, the flags signifying DBCS data and even/odd locations are set by the optimizer 35 according to the method described earlier. Both flags are set on because the DBCS data began at an odd buffer location. A more general representation of the optimizer's handling of the SO/SI pair may be seen in FIG. 8A.

Example 5: Effect of processing a RA order

A Repeat-to-Address (RA) order causes a designated character to be repeated in each location of a buffer from the current address to a designated ending address. When a single-byte character set is in use, one character, or one byte, is repeated; however, when DBCS is in use, one character, consisting of two bytes, is repeated.

FIG. 9 depicts the effects of a specific RA order on the map of FIG. 5. Assume that a Repeat-to-Address order is received at address X'903' specifying that the two bytes X'42C4' are to be repeated until the ending address X'977'. The order occurs within a DBCS field beginning at location X'901'.

Because the RA order occurs within a DBCS field, the optimizer 35 will already have set the flag signifying DBCS in the second extended attribute plane 60 for each of the DBCS characters in the field, including the locations between X'903' and X'977'. Since the DBCS characters begin at an odd-numbered address, the flag signifying that DBCS begins at an odd location will already have been set for all of the characters in the field.

Data stream validation

Figure 10:
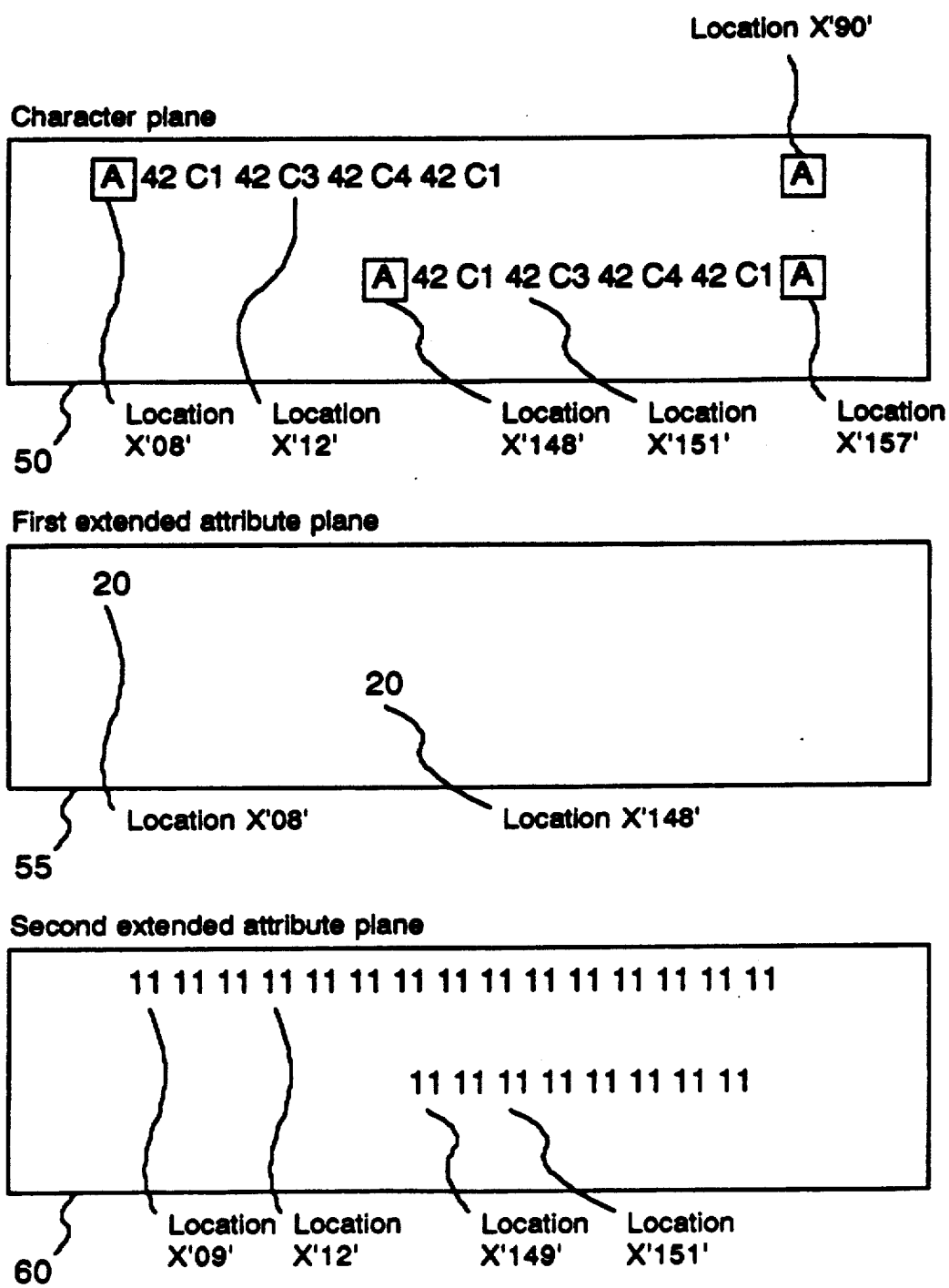
FIG. 10 is a map representing the contents of a sample buffer to illustrate the optimizer's data stream validation process.

FIG. 10 represents the sample contents of a map which the optimizer 35 will attempt to update, validating data stream orders in the process.

Assume now that in the character plane 50, a DBCS field originated by an SFE order begins at location X'08'. It continues until location X'90' where a non-DBCS attribute is located. Another DBCS field started by an SFE order begins with an attribute at location X'148', and ends with a non-DBCS attribute at location X'157'.

In the first extended attribute plane 55, an extended field attribute is located at locations X'08' and X'148', both locations where DBCS fields begin. The second extended attribute plane 60 has two flags set for each byte of the DBCS fields: one for every location where a DBCS character exists, and one for every byte of a DBCS character which begins at an odd-numbered location.

Now assume that an SBA (Set Buffer Address) order is sent pointing to location X'12', followed by two bytes of data. Assume also that another SBA order is sent pointing to location X'151', followed by four bytes of data.

Example of an invalid order

When the optimizer 35 receives the first SBA order, it performs the following tests:
(1) One flag in the second extended attribute plane is checked to see that DBCS data exists at the desired address. The flag has been previously set, indicating DBCS data at location X'12'.
(2) The other flag in the second extended attribute plane is checked to see if the DBCS characters begin on even addresses or odd addresses. The flag has been previously set, therefore DBCS characters begin on odd addresses.

The SBA order specifies an even-numbered location, yet DBCS characters in this field begin at odd locations. If this SBA order is immediately followed by graphic data, the order is invalid and is rejected by the optimizer.

When the optimizer 35 finds a data stream order invalid, it sends the data stream (including the order found invalid) unaltered. The optimizer then sends outbound data streams unaltered until it detects that the host computer 25 sends a command which erases the peripheral device buffer. Inbound data stream processing is unaffected. Resynchronization occurs on the next command which erases the buffer.

Example of a valid order

Now, when the optimizer 35 receives the second SBA order, it performs identical tests:
(1) One flag in the second extended attribute plane is checked to see that DBCS data exists at the desired address. The flag has been previously set, indicating DBCS data at location X'151'.
(2) The other flag in the second extended attribute plane is checked to see whether the DBCS characters begin on even addresses or odd addresses. The flag has been previously set, therefore DBCS characters begin on odd addresses.

The SBA order specifies an odd-numbered location, and DBCS characters in this field begin at odd locations. Therefore the SBA order is accepted as valid.

Figure 10A:
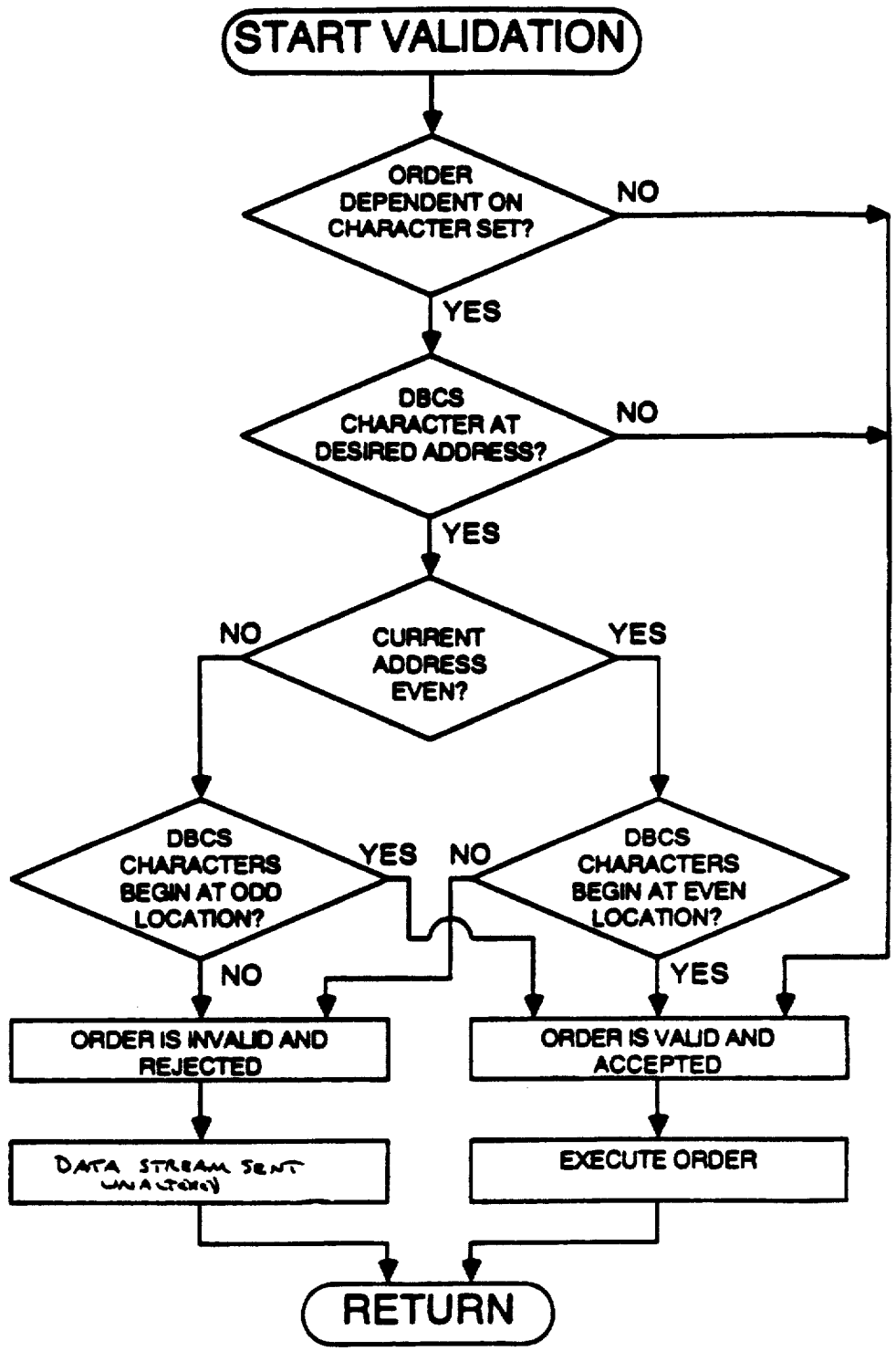
FIG. 10A is a flowchart representing the steps performed by the optimizer during the validation of a data stream order.

This validation process is illustrated more generally in FIG. 10A. When the optimizer system receives a data stream, it must scan the data stream for orders; each order is then validated using a subroutine such as the one depicted. Only when the order is validated may it be executed by the optimizer 35. Otherwise, an error condition will result.

An additional step is necessary when the valid order is a Repeat-to-Address order: the optimizer now assumes that the RA order is followed by an ending address and two characters to be repeated. Ordinarily (i.e., if a single-byte character set were in use), the optimizer would assume that the RA order is followed by an ending address and one character to be repeated.

Post-edit processing

After the optimizer system validates the data stream and updates the present-state image, post-edit processing is performed. Post-edit processing refers to the fact that the optimizer 35 waits until the present-state image has been updated before checking for certain errors in the data stream.

The optimizer 35 at this point verifies that any Shift Out/Shift In pairs occur in the correct order (Shift Out first); it also verifies that no DBCS character attributes appear within fields already designated DBCS, and that the DBCS characters themselves are valid. The optimizer 35 uses the flag in the second extended attribute plane 60 which marks the existence of DBCS to perform this post-edit processing.

If the optimizer 35 were to check for properly matched SO/SI pairs while still receiving and validating the data stream, it might falsely detect an error if a Shift In order were sent before a Shift Out order, when in fact the orders may be correct when placed in the peripheral device buffer in their respective locations.

Outgoing Data Stream Generation

The outgoing data stream generation process refers to the process in which the optimizer takes the updated image and performs a masking process with a previous state image to determine what data needs to be sent. Based on the "masked" image, the generation process constructs a new data stream to be sent to the peripheral device 15.

The generation process determines what data needs to be sent and which orders are to be used to place the data in the correct points within the buffer.

When placing character data in the data stream, if this data is part of a DBCS character, a check is made to ensure the data stream is correct. There are instances, for example, when sending a single byte which is part of a DBCS character would be invalid. Therefore, it may be determined by the optimizer that an extra byte which normally would not have been sent, needs to be placed in the data stream also. This is determined by checking the flags which indicate DBCS character presence and the odd or even starting point for this DBCS character.

When generating orders which are dependent on knowing if they reference DBCS buffer addresses, the optimizer ensures that these orders are syntactically correct. Orders which specify explicit buffer addresses cannot reference the second byte of a DBCS character. This is determined by checking the flags which indicate DBCS character presence and the odd or even starting point for this character.

This embodiment is only one method of carrying out the invention; one of ordinary skill having the benefit of this disclosure will find other ways to practice the invention taught here. Various modifications may be made to the described embodiment without departing from the spirit or the scope of the invention; it is therefore noted that the appended claims are intended to embrace all such modifications.

What is claimed is:

1. A method of processing data stream orders in a system for optimizing the transmission of formatted data streams between a host computer and a peripheral device, comprising the steps of:
   (a) maintaining a present-state image of the contents of the addressable buffers;
   (b) intercepting any data stream to form an intended-state image of the contents of the addressable buffers from the present-state image;
   (c) detecting an occurrence of a data stream order within the data stream, the data stream order indicating the start of a double-byte character set field;
   (d) setting a first flag in an extended attribute plane to indicate that the current location contains a character attribute indicating a double-byte character, or to indicate that the current location in a character plane contains a field attribute signifying double-byte characters;
   (e) setting a second flag in an extended attribute plane to indicate that the current location contains one byte of a double-byte character;
   (f) setting a third flag in an extended attribute plane to indicate that the current double-byte character begins on an odd-numbered address, if the current location contains part of a double-byte character;
   (g) accepting data stream orders as valid only upon checking the status of the first, second, and third flags to see if the data stream order is valid for the character set in use; and
   (h) generating valid data stream orders and character data.

2. The method of claim 1, including the step of: detecting that a repeat-to-address order will repeat data in a double-byte character set field by using the second flag, thereby using the two characters immediately following the order as the repeated characters.

3. The method of claim 1, including the step of: detecting light pen designator characters within a double-byte character set field by using the second flag.

4. The method of claim 1, including the step of: detecting special printer orders which exist in a double-byte character set field by using the second flag.

5. A method of processing a data stream, containing an instruction sequence identifying a sequence of at least one character as a double byte character set (DBCS) character sequence, in a system for optimizing a formatted data stream generated at a host unit for processing at a peripheral unit to modify information contents of an addressable buffer of said peripheral unit, said method comprising the steps of:
   (a) receiving the data stream from the host unit;
   (b) generating an updated-state map of the peripheral unit buffer, said map reflecting the information contents of said buffer that are expected to exist after processing of the data stream at the peripheral unit;
   (c) said updated-state map including at least one extension plane;
   (d) setting a DBCS-character flag in a said extension plane for each character in said DBCS character sequence;
   (e) altering the value of an odd-numbered flag in a said extension plane for each character in said DBCS character sequence; and
   (f) performing a map comparison optimization method, utilizing the updated-state map as an operand, to generate a substitute data stream.

6. The method of claim 5, further comprising the steps, performed prior to the performance of said map comparison optimization method, of:
   (a) detecting within said instruction sequence a Start Field Extended (SFE) order signifying a beginning point of a DBCS field; and
   (b) setting a DBCS-field flag in a said extension plane at a location corresponding to said DBCS field.

7. The method of claim 5, further comprising the steps, performed prior to said step (f) of performing a map comparison/optimization method, of:
   (1) testing the data stream for the presence of an invalid instruction to write a DBCS character; and
   (2) if an invalid instruction to write a DBCS character is detected, then transmitting the data stream to the peripheral unit without performing said step (f) of performing a map comparison/optimization method.

8. The method of claim 5, further comprising the step of post-edit verification that a Shift Out instruction and a Shift In instruction in the data stream appear in proper sequence.

9. A method of processing a data stream, containing a Start Field Extended (SFE) order signifying a beginning point of a double byte character set (DBCS) field, in a system for optimizing a formatted data stream generated at a host unit for processing at a peripheral unit to modify information contents of an addressable buffer of said peripheral unit, said method comprising the steps of:
   (a) receiving the data stream from the host unit;
   (b) generating an updated-state map of the peripheral unit buffer, said map reflecting the information contents of said buffer that are expected to exist after processing of the data stream at the peripheral unit;

(c) said updated-state map including at least one extension plane;

(d) setting a DBCS-field flag in a said extension plane at a location corresponding to said DBCS field;

(e) setting a DBCS-character flag in a said extension plane at each location between the beginning point of said DBCS field and a beginning point of a next field in said updated-state map;

(f) altering the value of an odd-numbered location flag in a said extension plane at each location between the beginning point of said DBCS field and the beginning point of said next field to indicate whether the beginning point of the DBCS field is at an odd-numbered location; and (g) performing a map comparison optimization method, utilizing the updated-state map as an operand, to generate a substitute data stream.

10. A machine-readable updated map data structure having information contents corresponding to information contents of an addressable buffer at a peripheral unit, said buffer containing a DBCS character sequence comprising at least one DBCS character, said data structure comprising a character plane and at least one extension plane and wherein:

(a) a said extension plane includes a DBCS-character flag at each location corresponding to a location in the buffer containing a DBCS character;

(b) a said extension plane includes an odd-numbered flag at each location corresponding to a location in the buffer containing a DBCS character, said odd-numbered flag indicating whether a beginning character of said DBCS character sequence is at an odd-numbered location in the buffer; and (c) if said character plane includes a field attribute byte indicating a beginning point of a double byte character set (DBCS) field, then a said extension plane including a DBCS-field flag.

11. A method of processing a data stream, containing an instruction sequence identifying a sequence of at least one character as a double byte character set (DBCS) character sequence, in a system for optimizing a formatted data stream generated at a host unit for processing at a peripheral unit to modify information contents of an addressable buffer of said peripheral unit, said method comprising the steps of:

(a) receiving the data stream from the host unit;

(b) generating an updated-state map of the peripheral unit buffer, said map reflecting the information contents of said buffer that are expected to exist after processing of the data stream at the peripheral unit;

(c) said updated-state map including at least one extension plane;

(d) setting a DBCS-character flag in a said extension plane for each character in said DBCS character sequence;

(e) altering the value of an odd-numbered flag in a said extension plane for each character in said DBCS character sequence;

(f) testing the data stream for the presence of an invalid instruction to write a DBCS character (1) to an odd-numbered location in a DBCS character sequence field beginning at an even-numbered location, or (2) to an odd-numbered location in a DBCS character sequence field beginning at an even-numbered location; and (g) if a said invalid instruction is detected, then (1) transmitting the data stream to the peripheral unit, else (2) performing a map comparison optimization method, utilizing the updated-state map as an operand, to generate a substitute data stream.

12. A program storage device, readable by a machine, tangibly embodying a program of instructions which, when read and executed by the machine, cause the machine to perform the method steps of any one of claims 1-11.

* * * * *